G. GARDNER.
Hot-Press for Molding Plates, &c., from Veneers and other Materials.

No. 204,808. Patented June 11, 1878.

WITNESSES:
Jas. E. Hutchinson
James H. Lange

INVENTOR:
George Gardner
per Edson Brothers
Attorneys.

UNITED STATES PATENT OFFICE.

GEORGE GARDNER, OF WESTFIELD, NEW JERSEY.

IMPROVEMENT IN HOT-PRESSES FOR MOLDING PLATES, &c., FROM VENEERS AND OTHER MATERIALS.

Specification forming part of Letters Patent No. 204,808, dated June 11, 1878; application filed April 15, 1878.

*To all whom it may concern:*

Be it known that I, GEORGE GARDNER, of Westfield, in the county of Union and State of New Jersey, have invented certain new and useful Improvements in Presses for Making Veneer-Plates, &c.; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
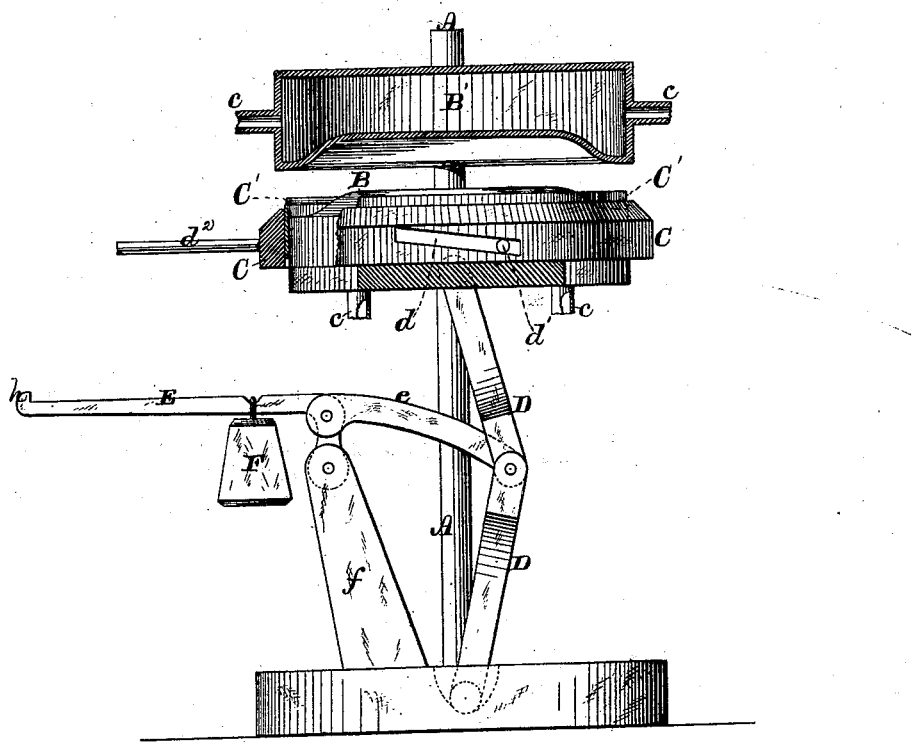
Figure 2:
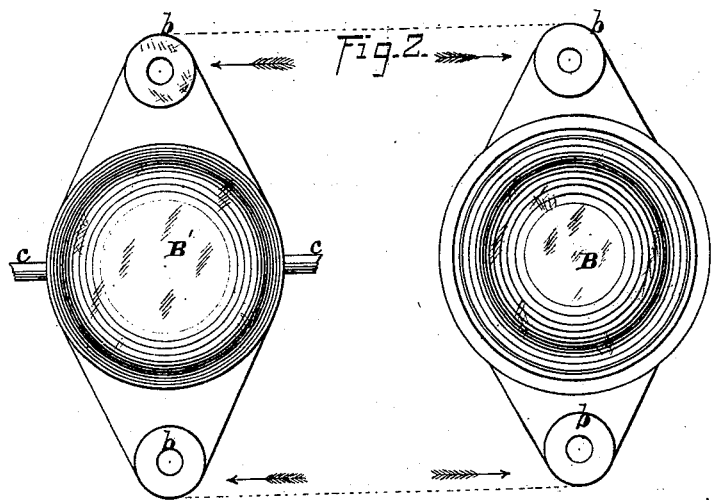

Figure 1 is a vertical transverse section of my improved press for making plates, &c., and Fig. 2 is a detached view of the upper die and a plan view of the lower die and its adjuncts.

Corresponding parts in the two figures are denoted by like letters.

This invention appertains to certain improvements in presses for making plates, &c., as more fully described in my patent for pressed wooden dishes, No. 196,005, dated October 9, 1877; and it consists in the employment of heated dies adapted to impart the desired shape or configuration to the material of which the article is to be made; secondly, in combining with said dies a knife or cutter arranged so as to cut or trim the article while under formation; and, thirdly, of certain details of construction, substantially as hereinafter more particularly set forth.

In the annexed drawing, A A mark two uprights, suitably fastened in place. B B' refer to two dies, arranged one above the other, and adapted to impart the desired configuration or shape to the plate or other article to be made. These dies are provided with tubular arms $b$ $b$, to permit of their adjustment upon the uprights A A, as shown, the upper one being stationary or made fast to the said uprights. These dies are chambered or made hollow, as seen in Fig. 1, and provided with steam or hot-air induction and eduction ports $c$ $c$. The chambers in the dies are for holding steam or hot air, to heat the dies to enable them to cook the sap and dry the material while undergoing formation or being shaped to form a plate or the desired article, and thus treat the material so as to enable it to permanently retain the imparted shape or configuration.

Around the lower die B is an encircling ring or annulus, C, having a correspondingly-shaped knife or cutter, C', for cutting or trimming the material undergoing formation. This annulus or ring C is provided with inclined slots or grooves $d$, which receive projections or studs $d^1$ secured to the lower die B, the object of which is to permit of the knife C' being vertically adjusted by giving it a limited rotary movement, which will cause it to trim or cut the material while undergoing formation into a circular shape, and thus complete the plate or article without having to be taken from the dies and passed through a second process to accomplish its completion.

The knife C' is operated by a handle, $d^2$, attached to the annulus or ring C, to which said knife is fastened. The lower or movable die B is adjusted upon the toggle-levers D D, having a tongue, $e$, to which is connected a notched bar or lever, E, pivoted to or in the upper end of a post or upright, $f$. The bar or lever E is notched, as at $g$, at which point the weight F is adjusted when the dies are spread apart and in readiness to receive the material to be operated on. The weight being thus adjusted upon the lever E, it will cause the latter to gradually descend and straighten the toggle-lever D, which will carry the movable die B, with the material to be operated on, up in contact with the upper stationary die B', when, by the inclination of the lever E, the weight will fall or slide down to the free end or extremity of said lever, and there be held by a shoulder or projection, $h$, upon said lever, and act with increased pressure upon said dies, and thus impart the desired shape to the plate or other article to be made from the material placed between said dies.

This press is exceedingly simple, inexpensive, and effective in the performance of its work.

Having thus described my invention, what I claim, and desire to secure by Letters Patent, is—

1. In a press for making plates, &c., the combination of two chambered or hollow dies, by which the same may be heated with steam or hot air, and arranged for joint operation, substantially as and for the purpose set forth.

2. In combination with the die B, the annular knife C', arranged to operate substantially as specified.

3. The combination, with the die B, of the annulus C, having the knife C', inclined slots or grooves $d$, which receive projections $d^1$ secured to said die, and handle $d^2$, substantially as and for the purpose set forth.

4. The combination of the dies B B', uprights A, toggle-levers D D, tongue $e$, support $f$, notched lever or bar E, and weight F, with or without the knife C', substantially as and for the purpose set forth.

In testimony that I claim the foregoing as my own I hereunto affix my signature in the presence of two witnesses.

GEO. GARDNER.

Witnesses:
   DAVID THORNTON,
   ADOLPH KIENDL.